United States Patent
Fiess et al.

(10) Patent No.: US 8,630,050 B2
(45) Date of Patent: Jan. 14, 2014

(54) MICROMECHANICAL COMPONENT, OPTICAL DEVICE, MANUFACTURING METHOD FOR A MICROMECHANICAL COMPONENT, AND MANUFACTURING METHOD FOR AN OPTICAL DEVICE

(75) Inventors: Reinhold Fiess, Durbach (DE); Ingo Ramsteiner, Leonberg (DE); Ulrich Kallmann, Tuebingen (DE)

(73) Assignee: Robert Bosch GmbH, Stuttgart (DE)

( * ) Notice: Subject to any disclaimer, the term of this patent is extended or adjusted under 35 U.S.C. 154(b) by 285 days.

(21) Appl. No.: 13/004,451

(22) Filed: Jan. 11, 2011

(65) Prior Publication Data

US 2011/0188140 A1   Aug. 4, 2011

(30) Foreign Application Priority Data

Jan. 14, 2010   (DE) .......................... 10 2010 000 878

(51) Int. Cl.
*G02B 27/00*   (2006.01)

(52) U.S. Cl.
USPC .......................................... 359/894

(58) Field of Classification Search
USPC ............. 359/212.1–214.1, 223.1–226.1, 290, 359/291, 894; 428/195.1
See application file for complete search history.

(56) References Cited

U.S. PATENT DOCUMENTS 8,169,678 B2 * 5/2012 Hofmann et al. .......... 359/221.2

* cited by examiner

*Primary Examiner* — Euncha Cherry
(74) *Attorney, Agent, or Firm* — Kenyon & Kenyon LLP

(57) ABSTRACT

A micromechanical component is described having a component which has a moth-eye structure which covers at least a partial surface of the component. At least a portion of the partial surface, as a first contact surface, may contact a contact component of the micromechanical component on at least one second contact area of the contact component, which has a needle-shaped microstructure, the moth-eye structure of the first contact area and the needle-shaped microstructure of the second contact area being at least partially interlocked with one another. Alternatively or additionally, at least a portion of the partial surface may be at least one partial area of an outer side and/or of an exposed inner side, facing the inner space, of the component configured as a light window. Also described is an optical device having such a micromechanical component, a manufacturing method for a micromechanical component, and a manufacturing method for an optical device.

11 Claims, 3 Drawing Sheets

MICROMECHANICAL COMPONENT, OPTICAL DEVICE, MANUFACTURING METHOD FOR A MICROMECHANICAL COMPONENT, AND MANUFACTURING METHOD FOR AN OPTICAL DEVICE

RELATED APPLICATION INFORMATION

The present application claims priority to and the benefit of German patent application no. 10 2010 000 878.8, which was filed in Germany on Jan. 14, 2010, the disclosure of which is incorporated herein by reference.

FIELD OF THE INVENTION

The present invention relates to a micromechanical component. Moreover, the present invention relates to an optical device having such a micromechanical component. Furthermore, the present invention relates to a manufacturing method for a micromechanical component, and a manufacturing method for an optical device.

BACKGROUND INFORMATION

A micromirror actuator which is situated in a housing composed of two silicon spacers fixedly bonded on both sides to the micromirror actuator, and two glass substrates bonded to the outer sides of the silicon spacers is discussed in U.S. Pat. No. 6,404,313 B2. To form the housing, the two glass substrates are first attached to the particular associated silicon spacer by carrying out a first and a second bonding process. The structures obtained in this manner are then fixedly mounted on both sides of the micromirror actuator by carrying out a third and a fourth bonding process. A further characteristic of the micromirror actuator situated in the housing is illustrated in FIG. 1.

FIG. 1 shows a schematic illustration of a functional principle of a conventional micromirror.

Micromirror 10 represented in FIG. 1 in a partially schematic form, having an adjustable mirror surface, is situated in a housing having at least one glass plate 12. The adjustable mirror surface is adjustable with respect to glass plate 12 about at least one rotational axis 14 in a range between a first extreme position 16a and a second extreme position 16b. By moving the adjustable mirror plate about the at least one rotational axis 14, a light beam 18 striking the mirror surface may be projected on a preferred point of a projection area 20 between a first external point 22a, which corresponds to first extreme position 16a, and a second external point 22b which corresponds to second extreme position 16b.

Before striking the mirror surface, light beam 18 penetrates the boundary surfaces of glass plate 12. This generally results in a reflection 24 of light beam 18 on glass plate 12, which is frequently oriented toward projection area 20, resulting in a static reflection point 26 on projection area 20.

SUMMARY OF THE INVENTION

The exemplary embodiments and/or exemplary methods of the present invention provide a micromechanical component having the features described herein, an optical device having the features described herein, a manufacturing method for a micromechanical component having the features described herein, and a manufacturing method for an optical device having the features described herein.

Advantageous specific embodiments are described in the subclaims.

A micromechanical component is also understood to mean a component having an optical, electronic, and/or optoelectronic design.

The moth-eye (biomimetic) structure situated on the component ensures, for example, moth-eye antireflection protection of the partial surface of the component thus covered. The ensured moth-eye antireflection protection is efficient, independent of the angle of incidence of the light, and suitable for a broad spectrum of wavelengths. A moth-eye structure having lateral structures smaller than the wavelength of a light beam results in a "soft" index of refraction profile without significant reflection. The ensured moth-eye antireflection protection is therefore advantageous, in particular for a light beam having multiple intensity maxima, for example in the colors red, green, and/or blue. The broadband characteristic and independence of the angle of incidence of light of the moth-eye antireflection protection are generally not achievable using conventional antireflection protection layers (interference layers, antireflection layers) on a microcomponent. In addition, thin antireflection layers may be easily detached from a surface of the microcomponent. The moth-eye structure may also be used to fixedly attach the component having the moth-eye structure to a contact component of the micromechanical component. "Contact component" refers to a further component of the micromechanical component on which the component having the moth-eye structure is fixedly mounted/situated.

The contact component may, for example, be a housing part or an interior part of the micromechanical component. "Fixedly mounting" is understood to mean the formation of a bond between the component having the moth-eye structure and the contact component, which may be detached only by application of significant force. "Fixedly mounting" could also be referred to as joining, at least partial interwedging, or mutual adhering of the components. If a contact surface of the contact component is provided with a needle-shaped microstructure, a mechanical/production problem may thus also be solved with relatively little effort by pressing the moth-eye structure and the needle-shaped microstructure into one another. For example, it is thus possible to fasten together two components, in particular two housing subunits, of the micromechanical component without a bonding step. The number of gluing, soldering, welding, and bonding steps to be carried out for manufacturing the micromechanical component may be reduced in this way. This simplifies the manufacture of the micromechanical component, improves its function, and/or reduces its manufacturing costs. Providing the component having the moth-eye structure which at least covers part of the surface of the component is thus particularly advantageous for the micromechanical component.

The exemplary embodiments and/or exemplary methods of the present invention allow, for example, (which may be two-sided) broadband and angle-independent antireflection protection of a cover glass/light window of a micromirror. At the same time, a partial area of the moth-eye structure formed for the antireflection protection may also be used for a fixed connection between the cover glass and at least one contact component of the micromirror having a needle-shaped microstructure. This may be achieved by simply pressing the cover glass onto the contact component, causing the moth-eye structure to become at least partially interlocked with the needle-shaped microstructure.

Further features and advantages of the exemplary embodiments and/or exemplary methods of the present invention are explained below with reference to the figures.

DETAILED DESCRIPTION

Figure 1:
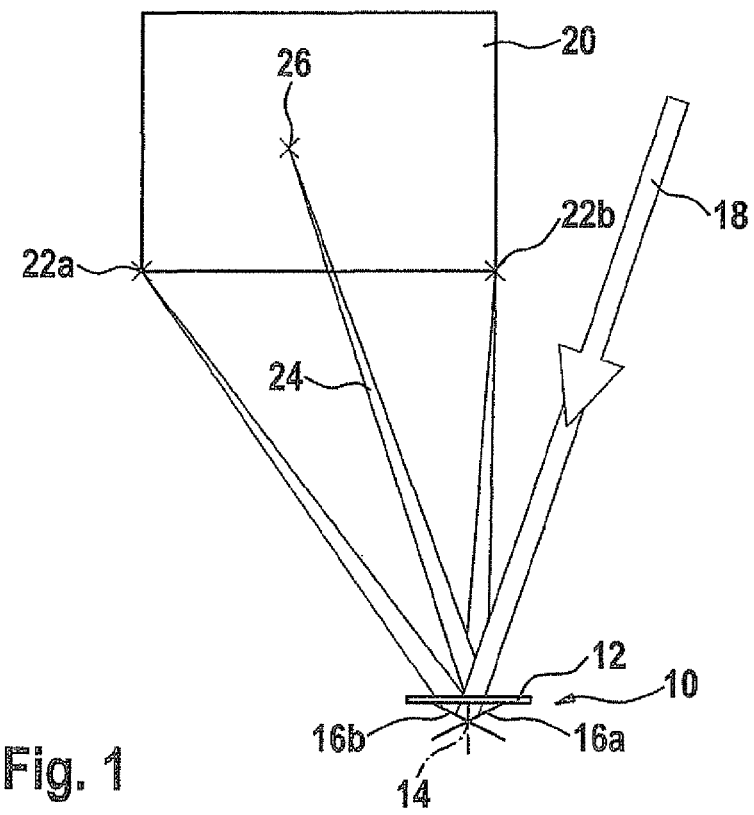
FIG. 1 shows a schematic illustration of a functional principle of a conventional micromirror.
Figure 2:
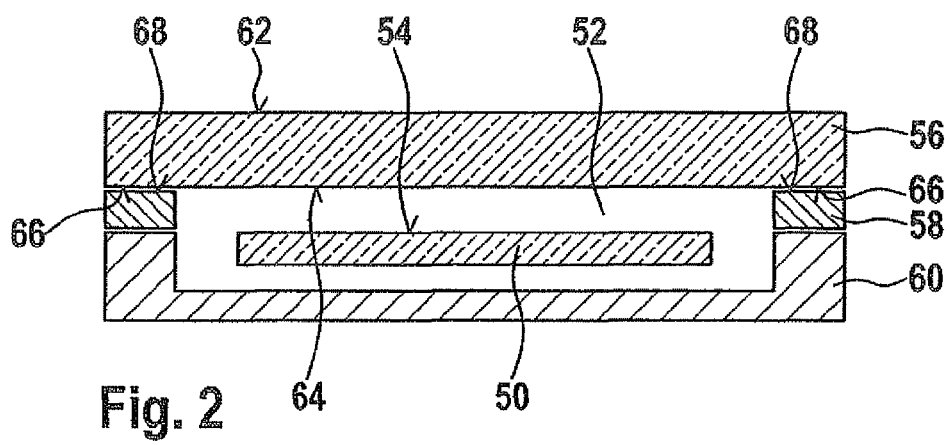
FIG. 2 shows a schematic cross section of one specific embodiment of the micromechanical component.

FIG. 2 shows a schematic cross section of one specific embodiment of the micromechanical component.

The micromechanical component schematically illustrated in FIG. 2 includes a mirror device 50 situated in an inner space 52 of the micromechanical component. However, it is pointed out that the micromechanical component described here is not limited to a design of the micromechanical component as a micromirror. Mirror device 50 is merely an example of one possible design for the micromechanical component. As an alternative or in addition to mirror device 50, another different optical component, actuator device, and/or sensor device may be situated in inner space 52. A suitable optical component may include, for example, a light detector, a beam splitter, and/or a lens.

Mirror device 50 may be configured so that a mirror surface 54 of mirror device 50 is adjustable with respect to the walls of inner space 52 of the housing. Mirror device 50 may have, for example, an electrostatic actuator, a magnetic actuator, and/or a piezoelectric actuator for adjusting mirror surface 54. However, the micromechanical component is not limited to a specific design of an adjustment component for moving an adjustable component, which may include an optical component, an actuator device, and/or a sensor device, situated in inner space 52.

The housing of the micromechanical component which encloses inner space 52 includes a cover plate 56 designed as a light window, a spacer 58, and a base part 60. Cover plate 56 designed as a light window is made, at least partially, of a transparent material such as glass, for example. However, implementation of the micromechanical component is not limited to the housing having subunits 56 through 60, described below. Instead of base part 60 or in addition to subunits 56 through 60, the housing may also have at least one further subunit.

Some surfaces of cover plate 56, spacer 58, and base part 60 form the boundary surfaces of inner space 52, and delimit inner space 52 from the external surroundings of the micromechanical component. The size of inner space 52 is selected in such a way that sufficient adjustability of the at least one adjustable component situated therein, such as mirror surface 54, for example, with respect to the housing is ensured. For forming the housing from subunits 56 through 60, a sufficiently large inner space 52 for advantageous adjustability of the at least one adjustable component situated in inner space 52 is easily ensured by using spacer 58, which may be structured from a semiconductor substrate, for example.

Subunits 56 through 60 of the housing may be configured and situated with respect to one another in such a way that inner space 52 is hermetically sealed. Such a hermetic seal of inner space 52 allows a partial vacuum in inner space 52 with respect to the outer pressure in the external surroundings of the micromechanical component. The partial vacuum present in inner space 52 simplifies the adjustment of an adjustable component, for example the adjustment of adjustable mirror surface 54, situated in inner space 52, in particular due to reduced friction. However, it is pointed out that subunits 56 through 60 of the housing may also be designed and put together in such a way that, if preferred, air flow may occur between inner space 52 and the external surroundings.

Cover plate 56 has a moth-eye structure which covers at least a partial surface of cover plate 56. In the illustrated specific embodiment of the micromechanical component, an outer side 62, an exposed inner side 64 facing inner space 52, and a cover plate contact surface 66 which contacts spacer 56 are covered by the moth-eye structure. The moth-eye structure formed on surfaces 62 through 66 may be made of an amorphous material, for example. The moth-eye structure on surfaces 62 through 66 may be made of the amorphous material of cover plate 56. In this case, the moth-eye structure on surfaces 62 through 66 may be easily implemented using the known method for forming a moth-eye structure.

A moth-eye structure should be understood to mean a microstructure (microsurface structure) which has a static or deterministic arrangement of structural units on a surface which is covered by the moth-eye structure. These structural units may be, for example, columns, cylinders, cones, pyramids, knobs, needles, or more complex shapes, for example a combination of various such structural units. As features, the dimensions of the individual structural units parallel to the macroscopic surface of the covered surface area may be smaller than the particular light wavelengths which are relevant to the application, and/or a cross-sectional area of a structural unit may increase toward one end facing away from the structured surface. For light wavelengths greater than a structure-specific limiting value, the indices of refraction of the material and of the surroundings blend to form an effective mean index of refraction which gradually changes perpendicular to the surface and thus makes the sharp boundary between the material and the surroundings less distinct. Similarly, the structural units may also be designed in such a way that the dimensions of the individual structural units parallel to the macroscopic surface are less than 900 nm, in particular less than 500 nm. Reference is made to the publication "Biomimetic Interfaces for High-Performance Optics in the Deep-UV Light Range" by T. Lohmüller, M. Helgert, M. Sundermann, R. Brunner, J. Spatz (Nano Letters, 2008, Vol. 8. No. 5, 1429-1433) for a description of an example of a moth-eye structure and production thereof.

A moth-eye structure may, for example, have a plurality of microcolumns, it being possible for the microcolumns to have an indentation, in particular on one end facing away from the covered surface, which is bordered by a partial region of the microcolumns. The indentation may be centrally located on the associated microcolumn, and/or tapers toward the surface covered by the moth-eye structure. The maximum height of the indentation perpendicular to the covered surface may be less than the maximum height of the associated microcolumn oriented perpendicular to the covered surface. The maximum height of the indentation is in a range, for example, of 10 nm to 100 nm, which may be in a range of 30 nm to 80 nm. The maximum height of the associated microcolumn may be in a range of 30 nm to 300 nm, in particular in a range of 50 nm to 150 nm. The microcolumns may have a circular or hexagonal periphery. The width of the microcolumn parallel to the covered surface may be in a range of 10 nm to 150 nm, which may be in a range of 30 nm to 100 nm, and/or may increase at one end of the microcolumn facing the covered surface.

The moth-eye structure allows moth-eye antireflection protection on surfaces 62 and 64 which are covered thereby. Thus, a light beam may be directed onto surfaces 62 and 64 without significant reflection of the light beam occurring at one of surfaces 62 and 64. An insignificant reflection is understood to mean a reflection having a low reflection coefficient, the reflection coefficient being, for example, less than 4% (0.04), which may be less than 1% (0.01), in particular less than 0.5% (0.005).

The intensity of the light beam entering inner space 52 may be increased by suppressing/reducing the reflection of a light beam penetrating one of surfaces 62 and 64. This simplifies in particular the detection of a light beam striking outer side 62, and/or allows an intensity of the light beam striking outer side 62 to be ascertained more accurately with the aid of a light detector situated in inner space 52. In addition, losses which occur in the use of micromirrors as a result of the beam passing twice through both cover glass surfaces are reduced.

The moth-eye antireflection protection of surfaces 62 and 64 also prevents the occurrence of a static reflection point, for example in the eye of a person and/or on a projection area, which is sometimes the case for reflection of a light beam on an optical boundary surface. Since a static reflection point of a conventional optical device often occurs in a central region of the projection area and/or has a high intensity, it is frequently perceived as objectionable by an observer. This disadvantage is eliminated in the micromechanical component described herein.

In addition, the light intensity of a light beam reflected on mirror surface 54 and exiting from the micromechanical component is increased by the moth-eye antireflection protection of surfaces 62 and 64. Thus, when the micromechanical component is used for a light projector, for example, better image intensity is ensured.

In addition to the advantages of the moth-eye structure on surfaces 62 and 64 described in the paragraphs above, the moth-eye structure formed on cover plate contact surface 66 allows an easily carried out option for forming a comparatively secure contact between cover plate 56 and spacer 58 which functions as a contact component of cover plate 56. For this purpose, a needle-shaped microstructure may be easily formed on a contact surface 68 of spacer 58 which contacts cover plate contact surface 66, and the moth-eye structure of first contact surface 66 and the needle-shaped microstructure of second contact surface 68 may be at least partially interlocked with one another. The needle-shaped microstructure may also be referred to as a needle structure or a microneedle structure.

The needle-shaped microstructure on spacer contact surface 68 may be made of a crystalline semiconductor material. In particular, the needle-shaped microstructure may be made of the crystalline semiconductor material from which the entire spacer 58 is structured. The needle-shaped microstructure of spacer contact surface 68 may be a black semiconductor coating made of a spacer 58 structured from a semiconductor material. In particular, the needle-shaped microstructure of spacer contact surface 68 may be a silicon coating (black silicon) of a spacer 58 structured from silicon. The black silicon coating may be formed, for example, by deep reactive ion etching or using the Mazur method.

Using a comparatively small force, a force-fit connection may be established between cover plate 56 and spacer 58 by simply bringing contact surfaces 66 and 68 into contact with one another. The moth-eye structure on cover plate contact surface 66 and the needle-shaped microstructure on spacer contact surface 68 are thus at least partially pressed into one another/interlocked. The force-fit connection thus established may have a good bond strength value of, for example, at least 5 MPa, which may be at least 10 MPa, in particular at least 18 MPa. The formation of the force-fit connection does not require an increase in temperature, as is the case, for example, for forming a bonded connection. Therefore, when components having a moth-eye structure and a needle-shaped microstructure are joined by at least partial interlocking of the moth-eye structure and the needle-shaped microstructure, there is no risk of heat damage to the joined components.

The advantages of the moth-eye structure as a means for antireflection protection and as a means for joining various components of a micromechanical component may be realized independently of one another. The synergistic effect of the two advantages described in the paragraphs above is merely an additional usefulness of the moth-eye structure.

In one refinement, at least one outer side of the force-fit connection may have a coating between cover plate 56 and spacer 58. The coating may include, for example, a curing material, for example an adhesive. This ensures an improved hermetic seal of inner space 52.

Spacer 58 may be affixed to base part 60 with the aid of a bonded connection. As an alternative to a bonded connection, however, a force-fit connection may be established with the aid of two needle-shaped microstructures, or one needle-shaped microstructure and one moth-eye structure, between subunits 58 and 60 of the housing.

Base part 60, which may be together with at least one unit of mirror device 50, may be structured from a semiconductor substrate. In addition, a device of subsequent inner space 52 designed as another optical component, actuator device, and/or sensor device may, together with base part 60, be structured from the semiconductor substrate.

In the specific embodiment described in the paragraphs above, the component of the micromechanical component provided with the moth-eye structure is designed as a cover plate. However, it is pointed out that the micromechanical component is not limited to a design of the component having the moth-eye structure as a cover plate 56. As an alternative or in addition to cover plate 56, another component of the micromechanical component may have a moth-eye structure.

Figure 3:
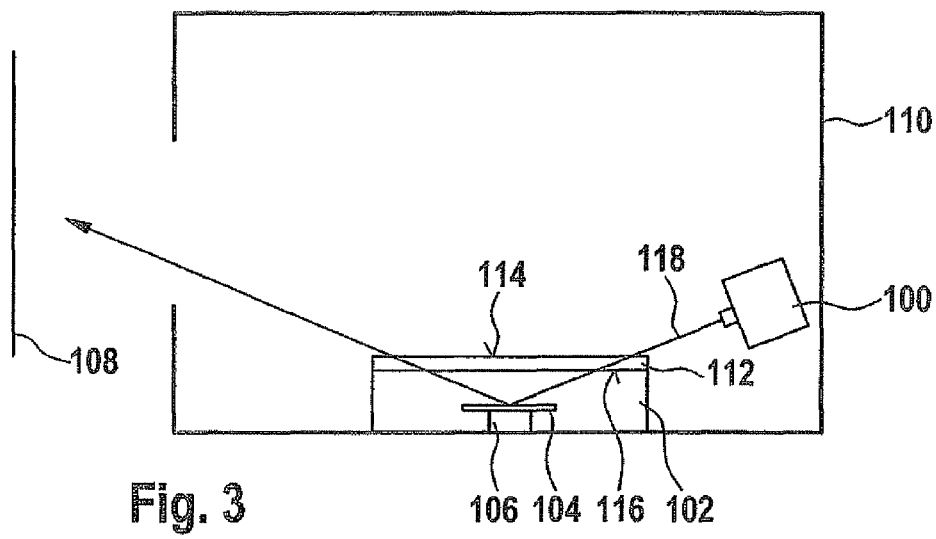
FIG. 3 shows a schematic cross section of one specific embodiment of the optical device.

FIG. 3 shows a schematic cross section of one specific embodiment of the optical device.

The optical device described below is designed as a projector, in particular a laser projector. One advantage of the projector is that it may also be designed as a portable projector due to its comparatively small size. However, it is pointed out here that the optical device described below is not limited to a design as a projector.

The optical device includes a light-emitting device 100 and a micromechanical component 102 designed as a deflection mirror. In addition, the optical device may include further components which together with light-emitting device 100 and micromechanical component 102 are situated in housing 110.

Light-emitting device 100 may be a laser, for example. Light-emitting device 100 may be configured to emit a multicolor laser beam. In particular, a three-color laser beam having a red, a green, and a blue component may be emitted by light-emitting device 100. Such a design is particularly advantageous in particular when the optical device is used as a projector, although the optical device described here is not limited to such a light-emitting device 100.

Micromechanical component 102 designed as a deflection device may also be referred to as a micromirror. In the specific embodiment illustrated, the micromechanical component has a mirror surface 104 which is adjustable about at least one rotational axis with the aid of an actuator device 106. Actuator device 106 may in particular be designed to move mirror surface 104 about two rotational axes. An image may thus be projected on a projection area 108 by adjusting mirror surface 104.

Micromechanical component 102 has at least one component 112 having a moth-eye structure which covers at least a partial surface of component 112. In the specific embodiment illustrated, component 112 having the moth-eye structure is designed as a light window which forms a subunit of a housing of micromechanical component 112. At least the outer side 114 or the inner side 116 of component 112, designed as a light window, is at least partially covered by the moth-eye structure. In particular, at least partial surfaces of sides 114 and 116 may have the moth-eye structure. Light-emitting device 100 and micromechanical component 102 may be configured and aligned with respect to one another in such a way that a light beam 118 emitted by light-emitting device 100 strikes the partial surfaces of sides 114 and 116 covered by the moth-eye structure.

In contrast to other antireflection coatings, the antireflective effect of the moth-eye structure is based not on an interference effect, but, rather, on a gradual change in the index of refraction perpendicular to the surface. Therefore, the effect of the antireflection protection is much less dependent on the angle of incidence of light beam 118 on the moth-eye structure. As a result, the moth-eye antireflection protection is particularly advantageous for use for a varying angle of incidence and/or for a broad wavelength range of light beam 118.

However, micromechanical component 102 is not limited to a design of component 112 having the moth-eye structure as a light window. Reference is made to the descriptions of the previous figures for further design options for micromechanical component 102.

Figure 4:
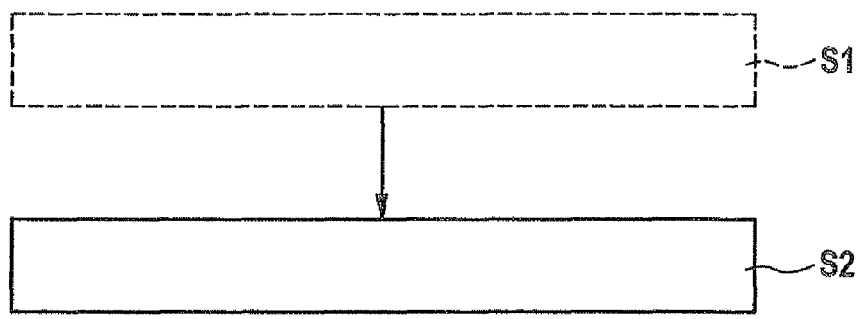
FIG. 4 shows a flow chart for illustrating a first specific embodiment of the manufacturing method for a micromechanical component.

FIG. 4 shows a flow chart for illustrating a first specific embodiment of the manufacturing method for a micromechanical component.

In an optional method step S1, a moth-eye structure is formed on a partial surface of a component of a micromechanical component to be subsequently manufactured. The moth-eye structure is formed in such a way that it covers at least a partial surface of the component. The moth-eye structure may be produced using a self-organization process, for example. The moth-eye structure may be easily formed, for example, with the aid of reactive ion etching (RIE), using an etching mask made of gold nanoparticles. However, the formation of the moth-eye structure is not limited to this method. Instead of forming the moth-eye structure on the component, a component already having a moth-eye structure may be used for the subsequent manufacturing method.

In a method step S2 the component having the moth-eye structure, which covers at least a partial surface of the component, is situated on or in the micromechanical component. For example, when the component is situated on or in the micromechanical component, at least a portion of the partial surface having the moth-eye structure, as a first contact surface, may be brought into contact with a contact component of the micromechanical component on at least one second contact surface of the further component, which has a needle-shaped microstructure, the moth-eye structure of the first contact surface and the needle-shaped microstructure of the second contact surface being at least partially interlocked with one another. This ensures a durable configuration of the component in contact with the further component on or in the micromechanical component.

The needle-shaped microstructure may, for example, be made of the same semiconductor material from which the contact component is structured. In particular, the needle-shaped microstructure may be a black silicon coating of a contact component structured from silicon. The black silicon coating may be formed using an etching process which may be easily and cost-effectively carried out.

The component having the moth-eye structure, as a light window, may also be situated on or in the micromechanical component. The component having the moth-eye structure may be aligned in such a way that the moth-eye structure covers a predefined incident light surface of the micromechanical component. Thus, for a design of the manufacturing method described here, the moth-eye structure may also be used for antireflection protection of an optical boundary surface which is struck by a light beam.

The numbering of method steps S1 and S2 does not specify a time sequence. For example, method step S2 may also be carried out before method step S1.

In a further, optional method step not illustrated, the manufactured micromechanical component together with a light-emitting device may be situated in an optical device. The light-emitting device and the micromechanical component may be situated and aligned with respect to one another in such a way that a light beam emitted by the light-emitting device strikes at least a partial area of the partial surface together with the moth-eye structure of the component.

Figure 5:
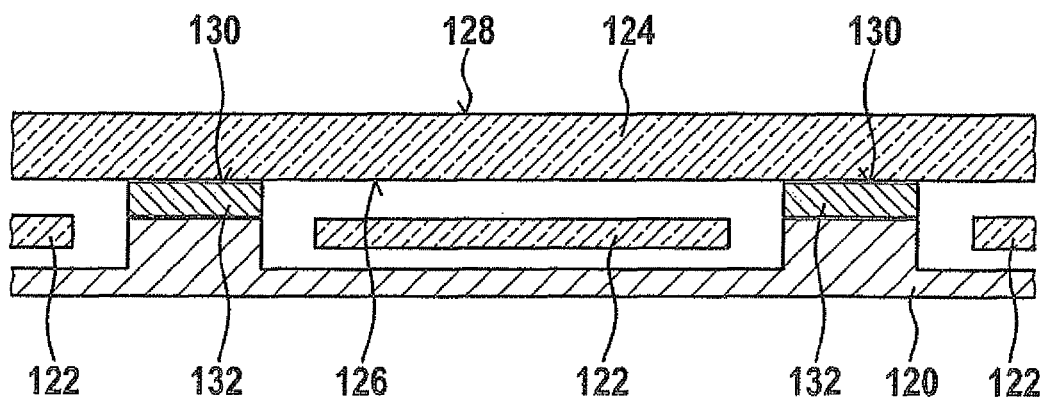
FIG. 5 shows a schematic cross section of a wafer for illustrating a second specific embodiment of the manufacturing method.

FIG. 5 shows a schematic cross section of a wafer for illustrating a second specific embodiment of the manufacturing method.

In the manufacturing method illustrated, patterns are structured into a first semiconductor wafer 120 which define the shapes of a subsequent base part, an optical component 122, a sensor device, and/or an actuator device for a plurality of subsequent micromechanical components. In addition, portions of the subsequent electronics system of the micromechanical components may be formed by applying layers (not illustrated) made of a conductive material and/or an insulating material.

A force-fit connection is established between a glass wafer 124 and a second semiconductor wafer in a method step which may be carried out previously, concurrently, or subsequently. The known surface-refining techniques for the moth-eye structure and a needle-shaped microstructure, such as black silicon coating, for example, may be used. For example, a moth-eye structure may be formed on at least partial areas of an inner side 126 of glass wafer 124 which contacts the second semiconductor wafer. In addition, a needle-shaped microstructure, such as a black silicon coating, may be formed on contact surfaces 130 of the second semiconductor wafer together with glass wafer 124. A black silicon coating refers to a silicon surface which is covered by a self-organized needle carpet, using an etching process. Since options for specifying the density and the length of the "needles" with the aid of process parameters are known, a more detailed explanation is not provided here. A force-fit connection may be established between glass wafer 124 and the second semiconductor wafer by joining the moth-eye structure of inner side 126 and the needle-shaped microstructure of contact surfaces 130.

A moth-eye structure may also be formed on an outer side 128 of glass wafer 124 which is situated opposite inner side 126. Sides 126 and 128 may be provided with the moth-eye structure, using a self-organization process which may be easily carried out. In one possible method, for example, glass wafer 124 is dipped into a colloidal suspension and is then subjected to plasma etching. This method may be efficiently and easily carried out in particular for fairly small surfaces. Reference is made to the above description concerning the advantages of a moth-eye structure on outer side 128.

Spacers 132 may then be structured from the second semiconductor wafer. A sufficiently large inner space in the subsequent micromechanical component is easily ensured in particular by using spacers 132. Spacers 132 may be affixed to first semiconductor wafer 120 using a bonding process, for example. The subsequent micromechanical components may be separated by multiple cutting of the structure composed of wafers 120 and 124 and spacers 132. By cutting, in each case a partial section of glass wafer 124, as a component having a moth-eye structure which covers at least a partial surface, is thus situated on the micromechanical component.

What is claimed is:

1. A micromechanical component, comprising:
   a moth-eye structure having a microstructure including a plurality of structural units, each one of which having a dimension smaller than a wavelength of an incident light; and
   a component having the moth-eye structure, which covers at least a partial surface of the component.

2. The micromechanical component of claim 1, wherein the moth-eye structure is made of an amorphous material.

3. A micromechanical component, comprising:
   a moth-eye structure; and
   a component having the moth-eye structure, which covers at least a partial surface of the component, wherein at least a portion of the partial surface, as a first contact area, contacts a contact component of the micromechanical component on at least one second contact area of the contact component, which has a needle-shaped microstructure, and the moth-eye structure of the first contact area and the needle-shaped microstructure of the second contact area being at least partially interlocked with one another.

4. The micromechanical component of claim 3, wherein the needle-shaped microstructure is made of a crystalline semiconductor material.

5. The micromechanical component of claim 1, wherein the component is a light window and is made, at least partially, of a transparent material, and is configured as a subunit of a housing of the micromechanical component, which has an inner space.

6. The micromechanical component of claim 5, wherein at least one of a mirror device, a light detector, a beam splitter, a lens, an actuator device, and a sensor device is situated in the inner space.

7. The micromechanical component of claim 5, wherein at least a portion of the partial surface is at least a partial area of at least one of an outer side and an exposed inner side, facing the inner space, of the component configured as a light window.

8. An optical device, comprising:
   a light-emitting device; and
   a micromechanical component, including:
      a moth-eye structure having a microstructure including a plurality of structural units, each one of which having a dimension smaller than a wavelength of an incident light; and
      a component having the moth-eye structure, which covers at least a partial surface of the component,
      wherein the component is a light window and is made, at least partially, of a transparent material, and is configured as a subunit of a housing of the micromechanical component, which has an inner space, and
      wherein at least a portion of the partial surface is at least a partial area of at least one of an outer side and an exposed inner side, facing the inner space, of the component configured as a light window;
   wherein the light-emitting device and the micromechanical component are situated and aligned with respect to one another so that a light beam emitted by the light-emitting device strikes the partial surface.

9. A manufacturing method for a micromechanical component, the method comprising:
   providing a micromechanical component; and
   situating a component having a moth-eye structure, which covers at least a partial surface of the component, on or in the micromechanical component, the moth-eye structure having a microstructure including a plurality of structural units, each one of which having a dimension smaller than a wavelength of an incident light.

10. A manufacturing method for a micromechanical component, the method comprising:
    providing a micromechanical component; and
    situating a component having a moth-eye structure, which covers at least a partial surface of the component, on or in the micromechanical component, wherein for situating the component on or in the micromechanical component, at least a portion of the partial surface, as a first contact surface, is brought into contact with a contact component of the micromechanical component on at least one second contact surface of the contact component, which has a needle-shaped microstructure, and the moth-eye structure of the first contact area and the needle-shaped microstructure of the second contact area being at least partially interlocked with one another.

11. A manufacturing method for an optical device, the method comprising:
    performing one of the following:
       (i) performing the following:
          situating a light-emitting device in the optical device; and
          manufacturing a micromechanical component by providing a micromechanical component, and by situating a component having a moth-eye structure, which covers at least a partial surface of the component, on or in the micromechanical component; and situating the manufactured micromechanical component in the optical device; or
       (ii) performing the following:
          situating a micromechanical component in the optical device, wherein the micromechanical component includes:
             a moth-eye structure; and
             a component having the moth-eye structure, which covers at least a partial surface of the component, wherein the component is a light window and is made, at least partially, of a transparent material, and is configured as a subunit of a housing of the micromechanical component, which has an inner space, and
             wherein at least a portion of the partial surface is at least a partial area of at least one of an outer side and an exposed inner side, facing the inner space, of the component configured as a light window;
          in the optical device;
    wherein the light-emitting device and the micromechanical component are situated and aligned with respect to one another so that a light beam emitted by the light-emitting device strikes the partial surface.

* * * * *